Patented June 24, 1952

2,601,238

UNITED STATES PATENT OFFICE 2,601,238

DENTIFRICE POLISHING COMPOSITION

Russell N. Bell, Chicago Heights, Ill., assignor to Victor Chemical Works, a corporation of Illinois No Drawing. Application February 14, 1950, Serial No. 144,191

8 Claims. (Cl. 167—93)

This invention relates to an improved dentifrice, particularly to an ammoniated dentifrice which likewise contains urea.

Dentifrices containing dibasic ammonium phosphate and urea are now common, particularly with the ratio of five parts phosphate to three parts urea. Mixed with these nitrogen containing ingredients are, of course, polishing agents such as precipitated chalk, dicalcium phosphate, etc. However, up to the present time dicalcium phosphate polishing agents have caused difficulty with caking. A chemical reaction between the dicalcium phosphate, diammonium phosphate and urea appears to be responsible.

It has now been found that this difficulty can be overcome by the use of an inhibitor which comprises a mixture of tricalcium phosphate and trimagnesium phosphate. Neither of these phosphates alone will prevent caking of the powder dentifrice. For example, a composition having the formula:

80% dicalcium phosphate (dihydrate)
10% tricalcium phosphate
5% diammonium phosphate
3% urea
2% flavor, etc.

will form a hard cake in one day at 45° C. On the other hand, a similar composition containing 5.0% tricalcium phosphate and 5.0% trimagnesium phosphate, instead of the 10% tricalcium phosphate of the above formula, remained substantially free-flowing for a period of 10 days under the accelerated test condition of storing at 45° C.

By increasing the amounts of tricalcium phosphate and trimagnesium phosphate to at least 10% tricalcium phosphate and 10% trimagnesium phosphate, the dentifrice composition was still in the form of a free-flowing powder at the end of a 14 day test period at 45° C.

The powdered dentifrice composition is prepared by first making a mixture of the dicalcium phosphate, tricalcium phosphate and trimagnesium phosphate and then adding the diammonium phosphate, urea and flavoring agents. In other words, it is necessary first to prepare the stabilized dicalcium phosphate composition.

The stabilized dicalcium phosphate abrasive composition is prepared in the form of a powdered mixture containing from 5–15% tricalcium phosphate, 5–15% trimagnesium phosphate, and the remainder being dicalcium phosphate dihydrate. While more than 15% each of the tricalcium and trimagnesium phosphates may be employed without detrimental effect, no advantage is gained by using the larger amounts.

The stabilized dicalcium phosphate of the present invention is characterized by the combination use of at least 5% of each of the stabilizing agents in order to form a stabilized product suitable for use with diammonium phosphate-urea mixtures in the formation of powdered dentifrices.

The above stabilized dicalcium phosphate product is also useful in other dentifrice compositions and as polishing agents for many purposes other than dentifrice polishing agents, for example, in the polishing of silver, brass, etc.

The dentifrice compositions described above are prepared by mixing the stabilized dicalcium phosphate preparation with the desired amounts of diammonium phosphate, urea and flavoring and foaming agents. A typical and preferred formula is as follows:

70.0% dicalcium phosphate (dihydrate)
10.0% tricalcium phosphate
10.0% trimagnesium phosphate
5.0% diammonium phosphate
3.0% urea
2.0% flavoring and foaming agents Another formula which gave highly satisfactory results was as follows:

52% dicalcium phosphate
20% tricalcium phosphate
10% trimagnesium phosphate
10% diammonium phosphate
6% urea
2% flavoring and foaming agents Other formulations with varying proportions of diammonium phosphate and urea have been prepared within the range of 2–10% for each of these components. Such compositions are stable and free-flowing powders of excellent physical condition. However, it is preferred to use approximately 5% diammonium phosphate and 3% urea since these proportions have been previously recommended as the most desirable from the standpoint of inhibiting the formation of caries.

It is not intended to limit the proportion of dibasic ammonium phosphate and urea specifically to these ranges in those cases where the ranges may be exceeded in dentifrice materials. In the event that the proportion of urea and/or diammonium phosphate is increased, higher proportions of tricalcium and trimagnesium phosphates may be employed.

The flavoring and foaming agents which may be employed in the dentifrice compositions may be selected from those commonly employed in dentifrice compositions. One percent of oil of wintergreen and one percent of Nacconol LAL were employed in the above examples. However, other flavoring oils and foaming agents may be employed without affecting the scope of the present invention.

The foregoing detailed description is given for clearness of understanding only and no unnecessary limitations should be understood therefrom as modifications will be obvious to those skilled in the art.

I claim:

1. A stabilized dicalcium phosphate abrasive composition comprising a powdered mixture of 70–90 parts dicalcium phosphate (dihydrate), 15–5 parts tricalcium phosphate and 15–5 parts trimagnesium phosphate.

2. A stabilized dicalcium phosphate abrasive composition comprising a powdered mixture of 80 parts dicalcium phosphate (dihydrate), 10 parts tricalcium phosphate and 10 parts trimagnesium phosphate.

3. A stabilized dicalcium phosphate abrasive composition comprising a powdered mixture of 70–90% dicalcium phosphate (dihydrate), 15–5% tricalcium phosphate and 15–5% trimagnesium phosphate.

4. A stabilized dicalcium phosphate abrasive composition comprising a powdered mixture of 80% dicalcium phosphate (dihydrate), 10% tricalcium phosphate and 10% trimagnesium phosphate.

5. A dentifrice composition comprising the compound of claim 1, at least 2 parts urea and at least 2 parts diammonium phosphate.

6. A dentifrice composition comprising the compound of claim 2, at least 2 parts urea and at least 2 parts diammonium phosphate.

7. A dentifrice composition comprising a powdered mixture of 59.5 to 92% dicalcium phosphate (dihydrate), 10–5% tricalcium phosphate, 10–5% trimagnesium phosphate, 10–2% diammonium phosphate, 10–2% urea and 0.5 to 4% flavoring and foaming agents.

8. A dentifrice composition comprising 70% dicalcium phosphate (dihydrate), 10% tricalcium phosphate, 10% trimagnesium phosphate, 5% diammonium phosphate, 3% urea and 2% flavoring and foaming agents.

RUSSELL N. BELL.

REFERENCES CITED

The following references are of record in the file of this patent:

UNITED STATES PATENTS

| Number | Name | Date |
|---|---|---|
| 2,041,473 | Janota | May 19, 1936 |
| 2,078,498 | Klarmann | Apr. 27, 1937 |
| 2,191,199 | Hall | Feb. 20, 1940 |
| 2,216,816 | Kuever | Oct. 8, 1940 |
| 2,216,821 | Long | Oct. 8, 1940 |
| 2,218,172 | Kokatnur | Oct. 15, 1940 |
| 2,359,326 | Moss | Oct. 3, 1944 |

OTHER REFERENCES

Jour. Amer. Pharm. Assn. Pharm. X (Pharm. Ed.) Nov. 1949, page 680.